(12) United States Patent
Shao et al.

(10) Patent No.: US 12,218,769 B2
(45) Date of Patent: Feb. 4, 2025

(54) DATA TRANSMISSION METHOD AND APPARATUS, AND STORAGE MEDIUM

(71) Applicant: ZTE Corporation, Shenzhen (CN)

(72) Inventors: Shijia Shao, Shenzhen (CN); Chuangxin Jiang, Shenzhen (CN); Huahua Xiao, Shenzhen (CN); Shujuan Zhang, Shenzhen (CN); Zhaohua Lu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 344 days.

(21) Appl. No.: 17/774,660

(22) PCT Filed: Nov. 9, 2020

(86) PCT No.: PCT/CN2020/127447
§ 371 (c)(1),
(2) Date: May 5, 2022

(87) PCT Pub. No.: WO2021/089037
PCT Pub. Date: May 14, 2021

(65) Prior Publication Data
US 2022/0416957 A1  Dec. 29, 2022

(30) Foreign Application Priority Data
Nov. 7, 2019  (CN) .......................... 201911083547.1

(51) Int. Cl.
*H04W 4/00* (2018.01)
*H04L 1/1867* (2023.01)
(Continued)

(52) U.S. Cl.
CPC .......... *H04L 1/1887* (2013.01); *H04L 5/0053* (2013.01); *H04W 72/23* (2023.01)

(58) Field of Classification Search
None
See application file for complete search history.

(56) References Cited

U.S. PATENT DOCUMENTS

2016/0353420 A1* 12/2016 You ...................... H04B 7/2656
2019/0149365 A1   5/2019 Chatterjee et al.
(Continued)

FOREIGN PATENT DOCUMENTS

| CN | 105991243 A | 10/2016 |
|---|---|---|
| CN | 107078863 A | 8/2017 |

(Continued)

OTHER PUBLICATIONS

Chinese Office Action Report for corresponding application 201911083547.1 dated Oct. 16, 2023.
(Continued)

*Primary Examiner* — Zewdu A Beyen
(74) *Attorney, Agent, or Firm* — CANTOR COLBURN LLP

(57) ABSTRACT

Provided are a data transmission method and apparatus, and a storage medium. The method includes: sending downlink control information (DCI) to a second communication node, where the DCI is configured for indicating one or more Hybrid Automatic Repeat reQuest (HARQ) offset values.

18 Claims, 8 Drawing Sheets

(51) Int. Cl.
*H04L 5/00* (2006.01)
*H04W 72/23* (2023.01)

(56) References Cited

U.S. PATENT DOCUMENTS

| | | | | |
|---|---|---|---|---|
| 2019/0349147 | A1* | 11/2019 | Aiba | H04L 5/0094 |
| 2020/0351933 | A1* | 11/2020 | Nam | H04W 72/23 |
| 2021/0029708 | A1* | 1/2021 | Khoshnevisan | H04L 5/0023 |

FOREIGN PATENT DOCUMENTS

| | | | |
|---|---|---|---|
| CN | 107733582 | A | 2/2018 |
| CN | 108811122 | A | 11/2018 |
| CN | 109088707 | A | 12/2018 |
| CN | 109314620 | A | 2/2019 |
| CN | 109474391 | A | 3/2019 |
| CN | 109802764 | A | 5/2019 |
| CN | 109803427 | A | 5/2019 |
| CN | 110166208 | A | 8/2019 |
| CN | 110351846 | A | 10/2019 |
| CN | 110380830 | A | 10/2019 |
| CN | 111092697 | A | 5/2020 |
| WO | 2015113295 | A1 | 8/2015 |
| WO | 2016119232 | A1 | 8/2016 |

OTHER PUBLICATIONS

Chinese Search Report for corresponding application 201911083547.1 dated Oct. 12, 2023.
European Search Report for corresponding application EP20884270; Report dated Oct. 24, 2023.
Spreadtrum Communications, "Discussion on UCI Enhancements for URLLC", 3GPP TSG RAN WGI #97, Reno USA, May 13-17, 2019, R1-1906358.
International Search Report for corresponding application PCT/CN2020/127447 filed Nov. 9, 2020; Mail date Jan. 27, 2021.
ZTE et al., "Mode 1 resource allocation schemes on sidelink", 3GPP TSG RAN WG1 #98 R1-1910278, Oct. 20, 2019.

* cited by examiner

Send DCI to a second communication node, where the DCI is configured for indicating one or more HARQ offset values — S110

Receive DCI sent by a first communication node, where the DCI is configured for indicating one or more HARQ offset values — S210

| R | Serving Cell ID | BWP ID | | | | | | Oct 1 |
| R | PUCCH Resource ID | | | | | | | Oct 2 |
| $S_7$ | $S_6$ | $S_5$ | $S_4$ | $S_3$ | $S_2$ | $S_1$ | $S_0$ | Oct 3 |
FIG. 12
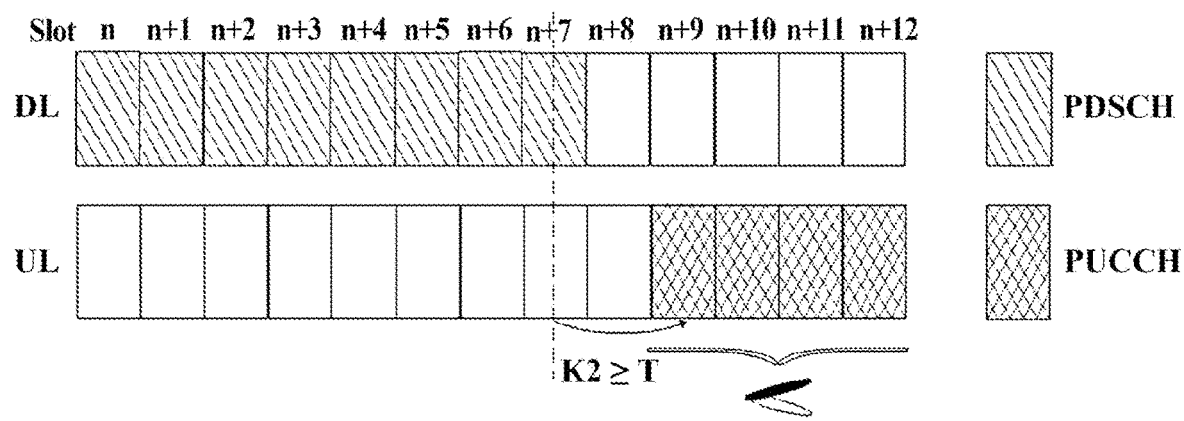
FIG. 13
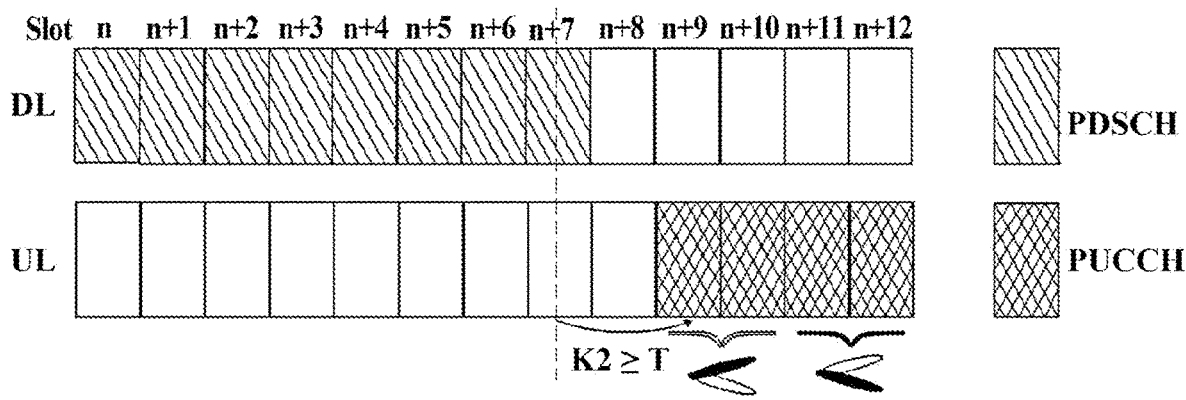
FIG. 14

DATA TRANSMISSION METHOD AND APPARATUS, AND STORAGE MEDIUM

CROSS-REFERENCES TO RELATED APPLICATIONS

This is a National Stage Application, filed under 35 U.S.C. 371, of International Patent Application No. PCT/CN2020/127447, filed on Nov. 9, 2020, which is based on and claims priority to Chinese Patent Application No. 201911083547.1 filed with the China National Intellectual Property Administration (CNIPA) on Nov. 7, 2019, the disclosure of which is incorporated herein by reference in its entirety.

TECHNICAL FIELD

The present application relates to wireless communication, for example, a data transmission method and apparatus and a storage medium.

BACKGROUND

In an enhanced Mobile Broadband (eMBB) scenario, multiple transmission and reception points (multi-TRP) joint transmission technology is used for effectively improving the transmission throughput of Long-Term Evolution (LTE), Long Term Evolution Advanced (LTE-A) and New Radio (NR) access technology through multi-TRP transmission. Another technology of NR is multi-panel transmission, which uses multiple antenna panels for transmission to obtain higher spectral efficiency. Moreover, the transmission reliability of a communication system must also be ensured. The use of sending or receiving repetitions of multi-TRP or multi-panel can improve the probability that a receiving end acquires correct information, effectively improving the transmission reliability in an Ultra-Reliable Low-Latency Communications (URLLC) scenario. However, in the related art, some problems are still to be solved in uplink control channel transmission of multi-TRP or multi-panel.

SUMMARY

Embodiments of the present application provide a data transmission method and apparatus and a storage medium, which save downlink transmission resources and reduce a feedback delay.

Embodiments of the present application provide a data transmission method. The data transmission method is applied to a first communication node and includes the following:

Downlink control information (DCI) is sent to a second communication node, where the DCI is configured for indicating one or more Hybrid Automatic Repeat reQuest (HARQ) offset values.

Embodiments of the present application provide a data transmission method. The data transmission method is applied to a second communication node and includes the following:

DCI is received which is sent by a first communication node, where the DCI is configured for indicating one or more HARQ offset values.

Embodiments of the present application provide a data transmission apparatus. The data transmission apparatus is applied to a first communication node and includes a sending module.

The sending module is configured to send DCI to a second communication node, where the DCI is configured for indicating one or more HARQ offset values.

Embodiments of the present application provide a data transmission apparatus. The data transmission apparatus is applied to a second communication node and includes a receiving module.

The receiving module is configured to receive DCI sent by a first communication node, where the DCI is configured for indicating one or more HARQ offset values.

Embodiments of the present application provide a storage medium. The storage medium is configured to store a computer program, where the computer program, when executed by a processor, implements the method according to any one of the preceding embodiments.

BRIEF DESCRIPTION OF DRAWINGS

FIG. 12 is a structure diagram of a physical uplink control channel (PUCCH) resource identification (PRI) according to an embodiment of the present application.

FIG. 13 is a diagram showing a beam used for PUCCH repetition transmissions according to an embodiment of the present application.

FIG. 14 is another diagram showing beams used for PUCCH repetition transmissions according to an embodiment of the present application.

DETAILED DESCRIPTION

Embodiments of the present application are described below in conjunction with drawings.

Figures 1, 2, 3:
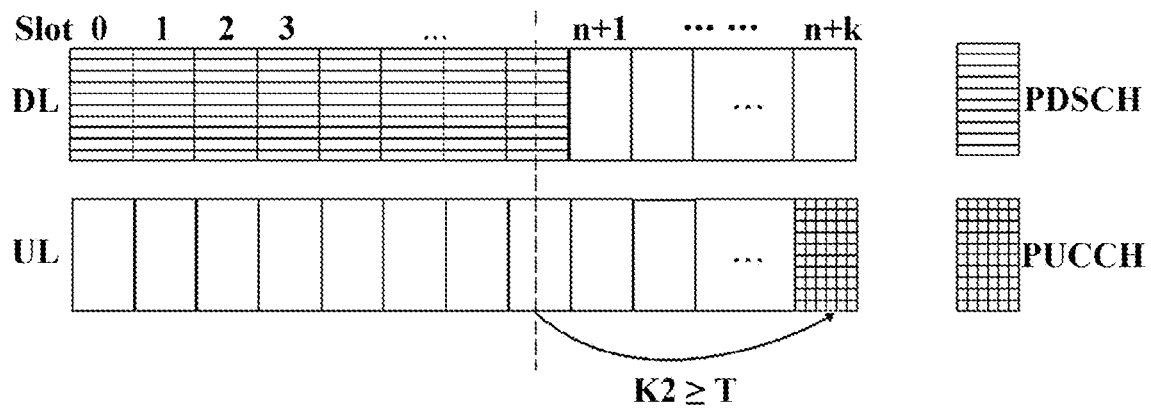
FIG. 1 is a diagram showing uplink feedback corresponding to physical downlink shared channel (PDSCH) repetition transmissions in the related art.
FIG. 2 is a flowchart of a data transmission method according to an embodiment of the present application.
FIG. 3 is a flowchart of another data transmission method according to an embodiment of the present application.

FIG. 1 is a diagram showing uplink feedback corresponding to physical downlink shared channel (PDSCH) repetition transmissions in the related art. In the case of PDSCH repetition transmissions in the related art, after all downlink data is received, the uplink feedback is as shown in FIG. 1. If a user equipment (UE) detects that a PDS CH is received in a slot n, or if the UE detects downlink control information (DCI) released through semi-persistent scheduling (SPS) in the slot n, the UE sends a corresponding Hybrid Automatic Repeat reQuest (HARQ)-acknowledgement (ACK) in a slot (n+k). Where k is indicated by a PDSCH-to-HARQ timing indicator in the DCI; if no PDSCH-to-HARQ timing indicator is in the DCI, k is indicated by a higher-layer parameter D1-DataToUL-ACK.

For a DCI format 1_0, the PDSCH-to-HARQ timing indicator is fixed to be 3 bits and has a value from {1, 2, 3, 4, 5, 6, 7, 8}. For a DCI format 1_1, PDSCH-to-HARQ feedback may be 0 bits, 1 bit, 2 bits or 3 bits. A bit width is defined by $\lceil \log_2(I) \rceil$, and I is determined by the number of rows of the higher-layer parameter D1-DataToUL-ACK.

As shown in FIG. 1, T denotes a downlink PDSCH processing delay, and the time when the UE starts to send the HARQ-ACK is later than the time T after an end of a last symbol carrying the PDSCH. If this requirement is not met, the UE does not send the HARQ-ACK. Multiple PDSCHs are scheduled by one piece of DCI.

The above feedback manner has the following problem: if the UE has successfully acquired information before receiving all the PDSCHs, but still has to perform feedback in the slot (n+k) indicated by the DCI, physical resources on a base station side will be wasted, and an uplink feedback delay will be increased.

The present application provides a data transmission method. Multiple PDSCH-to-HARQ_feedback timings are indicated at the same time by using one piece of DCI. An HARQ feedback timing parameter K2 is indicated in the following manner: a base station firstly configures multiple sets of possible values of the timing parameter K2 through a predefined radio resource control (RRC) parameter dl-DataToUL-ACK and then dynamically indicates one of the above plurality of sets of possible values of the timing parameter K2 through a PDSCH-to-HARQ feedback domain in the corresponding DCI for scheduling PDSCHs. When a value i of the PDSCH-to-HARQ feedback domain in the DCI is 0, 1, 2, . . . or n, the timing parameter K2 corresponds to a value in an (i+1)-th set (or row) configured by the RRC, thereby saving downlink transmission resources and reducing a feedback delay.

In the present application, a panel refers to an antenna panel which is denoted as the panel. In an embodiment, a UE may include one panel or two panels.

For data or signaling transmission, a physical channel includes a physical downlink control channel (PDCCH), a physical uplink control channel (PUCCH), a physical downlink shared channel (PDSCH) and a physical uplink shared channel (PUSCH). The PDCCH is used for transmitting physical downlink control information (DCI). The PUCCH is used for transmitting uplink control information, such as channel state information (CSI), a Hybrid Automatic Repeat reQuest (HARQ) and a scheduling request (SR). The PDSCH is used for transmitting downlink data, and the PUSCH is used for transmitting information such as uplink data and the CSI. One technique for improving reliability is to use the HARQ. That is, after a terminal or a base station receives a transport block, if the received transport block is detected to be correct, an acknowledgement (ACK) is fed back; otherwise, a negative acknowledgement (NACK) is fed back. The ACK and the NACK may be collectively referred to as an HARQ acknowledgement or may be referred to as one of the following: HARQ acknowledgement information, HARQ-ACK information, an HARQ-ACK, an HARQ-ACK acknowledgement, ACK/NACK information or an ACK/NACK codebook. In the present application, the ACK/NACK may also be referred to as the HARQ-ACK.

In order for both a sending end and a receiving end to know when the HARQ-ACK is fed back, in the related art, a configured HARQ offset value k is added to a receiving slot of the PDSCH so that a feedback slot of the HARQ-ACK is determined. For example, if the UE detects that the PDSCH is received in a slot n, or the UE detects DCI released through SPS in the slot n, the UE sends a corresponding HARQ-ACK in a slot (n+k). k is indicated by a PDSCH-to-HARQ timing indicator in the DCI; if no PDSCH-to-HARQ timing indicator is in the DCI, k is indicated by a higher-layer parameter D1-DataToUL-ACK. For a DCI format 1_0, the PDSCH-to-HARQ timing indicator is fixed to be 3 bits and has a value from {1, 2, 3, 4, 5, 6, 7, 8}. For a DCI format 1_1, PDSCH-to-HARQ feedback may be 0 bits, 1 bit, 2 bits or 3 bits. A bit width is defined by $[\log_2(I)]$, and I is determined by the number of rows of the higher-layer parameter D1-DataToUL-ACK. Hereinafter, a slot difference between the PDSCH and HARQ-ACK feedback is collectively referred to as an HARQ offset value.

In order to improve the reliability of data or signaling transmission, one manner is repetition transmissions. The repetition transmissions of M pieces of data (such as PDSCHs or PUSCHs) refer to that the M pieces of data carry exactly the same information, for example, the M pieces of data come from the same transport block (TB) and only correspond to different redundancy versions (RVs) after channel coding, or the M pieces of data correspond to the same RV after channel coding. The RVs herein refer to different RVs after channel coding is performed on transmitted data. Generally, the RV may be {0, 1, 2, 3}. Similarly, the repetition transmissions of M pieces of signaling (such as PDCCHs or PUCCHs) refer to that the M pieces of signaling carry the same content, for example, M PDCCHs carry the same content of DCI (for example, values of all domains are the same); for example, M PUCCHs carry contents which have the same value. The M pieces of repetition data (such as M repetition PUSCHs or M repetition PDSCHs) or the M pieces of repetition signaling (such as M repetition PUCCHs or M repetition PDCCHs) may come from M different transmission reception points (TRPs), M different antenna panels, M different bandwidth parts (BWPs) or M different carrier components (CCs), where the M antenna panels, the M BWPs or the M CCs may belong to the same TRP or multiple TRPs. A scheme for repetition transmissions includes, but is not limited to, at least one of the following schemes: a space-division multiplexing scheme Scheme 1, a frequency-division multiplexing scheme Scheme 2, an intra-slot time-division multiplexing scheme Scheme 3 or an inter-slot time-division multiplexing scheme Scheme 4. The frequency-division multiplexing scheme Scheme 2 further includes two types according to whether transport blocks have the same coding redundancy version. When data repeatedly transmitted twice correspond to the same RV, the frequency-division multiplexing scheme is Scheme2a; otherwise, the frequency-division multiplexing scheme is Scheme2b, and M is an integer greater than 1. The scheme for repetition transmissions may also be any combination of the above multiplexing schemes, for example, a combination of space-division multiplexing and frequency-division multiplexing or a combination of time-division multiplexing and frequency-division multiplexing.

The PDCCH is mapped to a group of resource elements (REs), for example, the PDCCH includes one or more control channel elements (CCEs), and one RE includes one subcarrier in frequency domain and one symbol in time domain. A set of one or more CCEs for transmitting the PDCCH may also be referred to as a control resource set (CORESET), which includes multiple physical resource blocks in the frequency domain and K symbols in the time domain, where K is a natural number, for example, K may be an integer 1, 2 or 3. The symbol herein includes, but is not limited to, one of the following: an orthogonal frequency-division multiplexing (OFDM) symbol, a Single-carrier Frequency-Division Multiple Access (SC-FDMA) symbol or an orthogonal frequency-division multiple access (OFDMA) symbol. To detect the PDCCH, candidate PDCCHs at the same aggregation level are configured into a set, and the set of candidate PDCCHs at this level is a search space (SS). A set of multiple SSs forms one search space set (SS SET or SSS), and each terminal may be configured with at least one SSS. To detect the PDCCH, a PDCCH monitoring occasion and a PDCCH monitoring candidate of a current terminal are configured in the SS. The PDCCH monitoring occasion is PDCCH monitoring time domain information determined by a PDCCH monitoring periodicity, a PDCCH monitoring offset, a PDCCH monitoring pattern and the like on an activated BWP. The PDCCH monitoring candidate is one candidate PDCCH to be monitored, which is configured in the SS. In addition, the PDCCH includes multiple formats, each of the multiple formats corresponds to one piece of DCI in a corresponding format, and each piece of DCI includes multiple signaling indicator fields. The detection may also be referred to as monitoring or a blind detection and is used for determining a PDCCH for transmitting DCI to the terminal among multiple candidate PDCCHs. Multiple CORESETs may also be divided into multiple CORESET groups, and each CORESET group includes at least one CORESET.

In an implementation, FIG. 2 is a flowchart of a data transmission method according to an embodiment of the present application. The present embodiment is performed by a first communication node. For example, the first communication node may be a base station. As shown in FIG. 2, the present embodiment includes S110.

In S110, DCI is sent to a second communication node, where the DCI is configured for indicating one or more HARQ offset values.

In an embodiment of the present application, the second communication node may be a UE. The HARQ offset value is used for determining a slot where the second communication node feeds back an HARQ-ACK. In an embodiment, after the first communication node sends the DCI to the second communication node, the second communication node determines the slot where the second communication node feeds back the HARQ-ACK according to the HARQ offset value indicated by the DCI. Therefore, in the case where information has been successfully acquired before all PDSCHs are received, there is no need to wait for a slot (n+k) for the HARQ-ACK to be fed back, thereby saving downlink transmission resources and reducing a feedback delay.

In an embodiment, X groups of HARQ offset values are configured by higher-layer signaling, and one group of HARQ offset values is selected from the configured multiple groups of HARQ offset values by using the DCI, where each of the X groups of HARQ offset values includes one or more HARQ offset values, and X is an integer greater than or equal to 1.

In an embodiment, N groups of HARQ offset values are configured by higher-layer signaling and one HARQ offset value is selected from each of the configured N groups of HARQ offset values by using the DCI, where each of the N groups of HARQ offset values includes one or more HARQ offset values, and N is an integer greater than or equal to 1.

In an example, N HARQ offset values (denoted as PDSCH-to-HARQ_feedback timings) are indicated by one piece of DCI. In an embodiment, an HARQ feedback timing parameter K2 is indicated in the following manner: the base station configures multiple sets of values of the timing parameter K2 through a predefined RRC parameter D1-DataToUL-ACK and then dynamically indicates one of the above multiple sets of possible values of the timing parameter K2 through a PDSCH-to-HARQ feedback domain in the corresponding DCI for scheduling PDSCHs. When a value i of the PDSCH-to-HARQ feedback domain in the DCI is 0, 1, 2, . . . or n, the timing parameter K2 corresponds to a value in an (i+1)-th set (or row) configured by the RRC.

In an embodiment, the following two aspects are described: how the base station indicates a respective one of N HARQ offset values corresponding to each of N PUCCH transmissions through one piece of DCI, and how the base station controls a downlink PDSCH according to received feedback information, where N is an integer greater than 1.

For example, Table 1 is a look-up table between an HARQ offset value indicator field and an HARQ offset value according to an embodiment of the present application. The DCI indicates an HARQ offset value indicator field (denoted as PDSCH-to-HARQ_feedback timing indicator) of D bits, where D may be one of 1, 2, 3 or other integers. Each HARQ offset value indicator field is used for indicating one group of HARQ offset values, and each group of HARQ offset values includes one or more integer values. An indication method of the DCI includes, but is not limited to, the method shown in Table 1. A value i of the HARQ offset value indicator field corresponds to an (i+1)-th group of HARQ offset values from the higher-layer signaling D1-DataToUL-ACK, D1-DataToUL-ACK includes at least one group of HARQ offset values, and each group of HARQ offset values may include one or more HARQ offset values.

TABLE 1

Look-up table between the HARQ offset value
indicator field and the HARQ offset value HARQ Offset Value
Indicator Field

| 1 bit | 2 bits | 3 bits | HARQ Offset Value |
|---|---|---|---|
| '0' | '00' | '000' | First group of values from D1-DataToUL-ACK, for example, {1, 2} |
| '1' | '01' | '001' | Second group of values from D1-DataToUL-ACK, for example, {1, 3, 5} |
|  | '10' | '010' | Third group of values from D1-DataToUL-ACK, for example, {4} |
|  | '11' | '011' | Fourth group of values from D1-DataToUL-ACK |
|  |  | '100' | Fifth group of values from D1-DataToUL-ACK |
|  |  | '101' | Sixth group of values from D1-DataToUL-ACK |
|  |  | '110' | Seventh group of values from D1-DataToUL-ACK |
|  |  | '111' | Eighth group of values from D1-DataToUL-ACK |

Table 2 is another look-up table between an HARQ offset value indicator field and an HARQ offset value according to the present application. As shown in Table 2, the value i of the HARQ offset value indicator field corresponds to an (i+1)-th HARQ offset value from the higher-layer signaling D1-DataToUL-ACK and an (i+1)-th HARQ offset value from D1-DataToUL-ACK1, where i=0, 1, . . . , D0−1, and D0=$2^D$. In an embodiment, each of D1-DataToUL-ACK and D1-DataToUL-ACK1 includes at least D0 HARQ offset values. In an embodiment, the higher-layer signaling or the RRC signaling described herein may also be replaced by other signaling, for example, media access control-control element (MAC-CE) signaling, which is not limited.

TABLE 2

Another look-up table between the HARQ offset
value indicator field and the HARQ offset value HARQ Offset Value
Indicator Field

| 1 bit | 2 bits | 3 bits | HARQ Offset Value |
|---|---|---|---|
| '0' | '00' | '000' | First value from D1-DataToUL-ACK and first value from D1-DataToUL-ACK1 |
| '1' | '01' | '001' | Second value from D1-DataToUL-ACK and second value from D1-DataToUL-ACK1 |
|  | '10' | '010' | Third value from D1-DataToUL-ACK and third value from D1-DataToUL-ACK1 |
|  | '11' | '011' | Fourth value from D1-DataToUL-ACK and fourth value from D1-DataToUL-ACK1 |
|  |  | '100' | Fifth value from D1-DataToUL-ACK and fifth value from D1-DataToUL-ACK1 |
|  |  | '101' | Sixth value from D1-DataToUL-ACK and sixth value from D1-DataToUL-ACK1 |
|  |  | '110' | Seventh value from D1-DataToUL-ACK and seventh value from D1-DataToUL-ACK1 |
|  |  | '111' | Eighth value from D1-DataToUL-ACK and eighth value from D1-DataToUL-ACK1 |

D1-DataToUL-ACK and D1-DataToUL-ACK1 are parameters configured by the higher-layer signaling, where each of D1-DataToUL-ACK and D1-DataToUL-ACK1 includes at least D0 values.

The value of the HARQ offset value in Tables 1 and 2 represents a slot offset from a reference point to HARQ-ACK feedback. In an embodiment, a positive value of the HARQ offset value indicates that the HARQ-ACK feedback is after the reference point; a negative value of the HARQ offset value indicates that the HARQ-ACK feedback is before the reference point.

When a slot offset of the HARQ-ACK selected by the DCI includes multiple values, the UE needs to repeatedly send PUCCHs in the corresponding multiple slots to feed back the ACK/NACK, thereby improving the probability that the PUCCHs are transmitted correctly.

In an embodiment, the reference point of the HARQ offset value is selected in one of the following manners: a slot where an N-th PDSCH transmission among N PDSCH repetition transmissions is located; a slot where a first PDSCH in N PDSCH repetition transmissions is located; or a slot where an M-th (0<M<N) PDSCH in the middle of N PDSCH repetition transmissions is located. In an embodiment, a feedback slot corresponding to the configured HARQ offset value satisfies the following conditions: an interval between a first feedback slot and a transmission slot of a first PDSCH being greater than or equal to a PDSCH processing delay; and an interval between a last feedback slot and an ending transmission slot of PDSCHs being greater than or equal to the PDSCH processing delay.

In an embodiment, in the case of N PDSCH repetition transmissions, the feedback slot corresponding to the configured HARQ offset value further satisfies the following condition: the first feedback slot is at least after the second communication node receives M (M=⌈N/2⌉ or ⌊N/2⌋) PDSCHs, where M=⌈N/2⌉ or M=⌊N/2⌋.

In an embodiment, in the case where ACK information fed back by the second communication node is received, the UE is notified to no longer feed back an HARQ-ACK corresponding to a repeatedly transmitted PDSCH in another subsequent slot.

In an embodiment, in the case where a master communication node among multiple first-type communication nodes receives the ACK information fed back by the second communication node, the master communication node immediately stops sending the repeatedly transmitted PDSCH; in the case where the master communication node among the multiple first-type communication nodes receives the ACK information fed back by the second communication node, a data sending case of other first-type communication nodes includes one of the following: in the case where the other first-type communication nodes have sent data, the master communication node notifies the other first-type communication nodes to stop sending remaining repeatedly transmitted PDSCHs; or in the case where the other first-type communication nodes have not sent data, the master communication node notifies the other first-type communication nodes that the data does not need to be sent.

In an embodiment, the data transmission method further includes that a time interval between two repetition transmissions being greater than or equal to L slots, where L may be configured by a higher-layer parameter.

FIG. 3 is a flowchart of another data transmission method according to an embodiment of the present application. The present embodiment is performed by a second communication node. The second communication node may be a UE. As shown in FIG. 3, the present embodiment includes S210.

In S210, DCI is received which is sent by a first communication node, where the DCI is configured for indicating one or more HARQ offset values.

In an embodiment, in the case where an ACK is fed back to the first communication node at a first occasion, an HARQ-ACK is no longer fed back at a second occasion and remaining downlink data is no longer received.

In an implementation, a system in the present embodiment includes one terminal and one TRP. PDSCHs transmitted by the one TRP are repeated.

Figure 4:
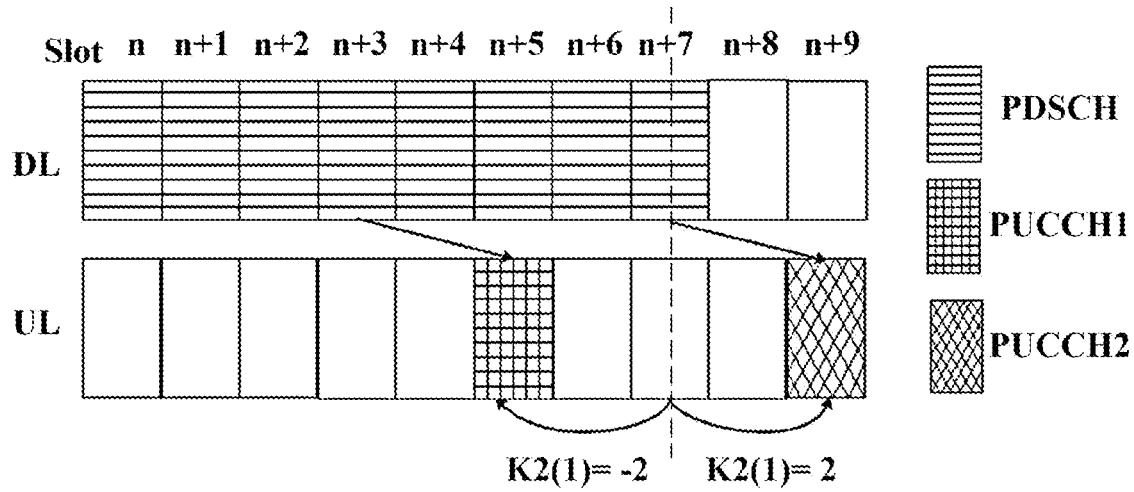
FIG. 4 is a diagram showing uplink transmission feedback corresponding to PDSCH repetition transmissions according to an embodiment of the present application.

For example, it is assumed that a value of an HARQ offset value in DCI is (2, −2). FIG. 4 is a diagram showing uplink transmission feedback corresponding to PDSCH repetition transmissions according to an embodiment of the present application.

A base station performs the steps below.

(1) The base station configures a reference point of N HARQ offset values, with reference to which the DCI indicates a feedback slot of an HARQ-ACK, that is, indicates from which PDSCH a slot offset of the HARQ-ACK is calculated.

In an embodiment, a manner in which the base station selects the reference point of the HARQ offset values includes, but is not limited to, one of the three selection manners described below.

Manner one: a slot where a last PDSCH among multiple PDSCHs is located may be used as the reference point of the HARQ offset values. For example, as shown in FIG. 4, a slot n+7 is the reference point of the HARQ offset values.

Manner two: a slot where a first PDSCH among multiple transmitted PDSCHs is located may be used as the reference point of the HARQ offset values. As shown in FIG. 4, a slot n is the reference point of the HARQ offset values. In the case where the value of the HARQ offset value is 2, an HARQ ACK/NACK is fed back in a slot n+2.

Manner three: a slot where an intermediate PDSCH among multiple transmitted PDSCHs is located may be used as the reference point of the HARQ offset values. For example, the PDSCH is transmitted N times in total, and the reference point of the HARQ offset values may be an (N/2)-th PDSCH or an (N/2+1)-th PDSCH. As shown in FIG. 4, the reference point of the HARQ offset values may be a slot n+3 (or a slot n+4), and in the case where the value of the HARQ offset value is −2, the HARQ ACK/NACK is fed back in a slot n+1 (or a slot n+2). In an embodiment, the time occasion the HARQ ACK/NACK is fed back is the time of the reference point of the HARQ offset values+a feedback offset of the HACK-ACK.

In an embodiment, to efficiently use feedback information, when the base station selects the HARQ offset value, a feedback slot corresponding to the HARQ offset value configured by the base station satisfies the following conditions: an interval between a first feedback slot (a value of a minimum feedback slot) indicated by the DCI and a transmission slot of a first PDSCH is at least greater than or equal to a PDSCH processing delay T, where the first feedback slot cannot be too early, so as to avoid the case where the possibility of correct reception is reduced due to insufficient information received, for example, the first feedback slot is at least after a second communication node receives data on M PDSCHs (where M=⌈N/2⌉ or M=⌊N/2⌋, and N is a total number of PDSCH repetition transmissions); and an interval between a last feedback slot (a value of a maximum feedback slot) indicated by the DCI and an ending transmission slot of the PDSCHs is at least greater than or equal to the PDSCH processing delay T.

(2) The base station receives the HARQ-ACK fed back by the UE and determines a data transmission manner according to the received HARQ-ACK.

Figure 5:
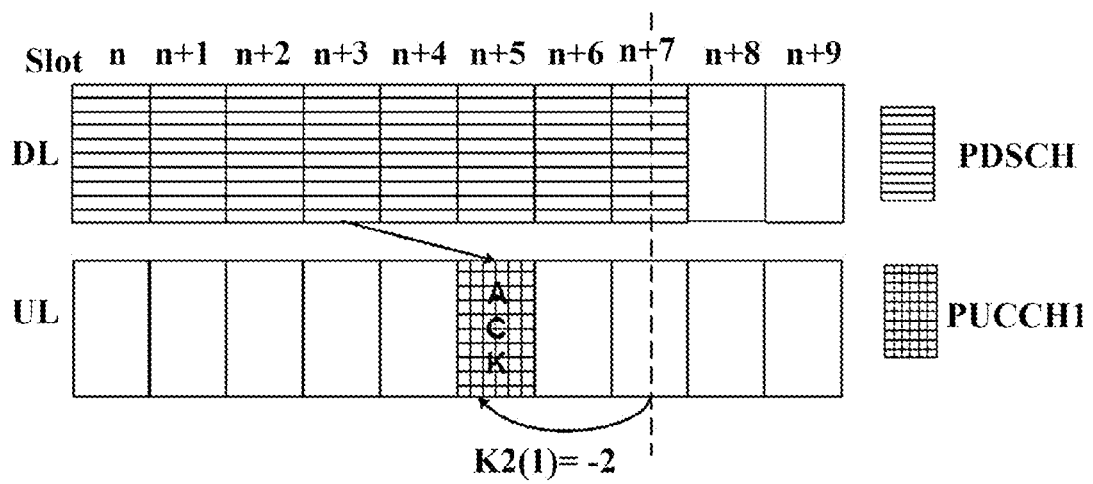
FIG. 5 is another diagram showing uplink transmission feedback corresponding to PDSCH repetition transmissions according to an embodiment of the present application.

In an embodiment, the base station performs one of the following operations in the case where the feedback information in the first feedback slot and received by the base station is an ACK. FIG. 5 is another diagram showing uplink transmission feedback corresponding to PDSCH repetition transmissions according to an embodiment of the present application.

As shown in FIG. 5, the ACK is fed back on a PUCCH in a slot n+5, indicating that the UE has successfully received downlink data and the UE does not need to receive a subsequent PDSCH repetition. The base station receives the feedback in the slot n+5 or a subsequent slot, and the base station may determine whether to stop sending data according to an actual situation. If not all the data has been sent when the base station receives uplink feedback, a downlink transmission of the PDSCH can be stopped immediately. If all the data has been sent at this time, other data can be directly transmitted without waiting for feedback from the UE.

In an embodiment, the base station continues sending the data when the feedback information in the first feedback slot and received by the base station is an NACK.

In an embodiment, the terminal performs the steps below.

In S1, the N HARQ offset values configured by the base station are received. For example, as shown in FIG. 4, the base station configures two HARQ offset values for the UE, which are 2 and −2, respectively.

In S2, the HARQ-ACK is sent in a corresponding slot according to the configuration of the N HARQ offset values.

If a first HARQ offset value is successfully decoded, the ACK is fed back to the base station, and a remaining PDSCH repetition transmission is no longer received. When the base station sends other PDSCHs again, the PDSCHs continue to be received.

If the first HARQ offset value fails to be decoded, the UE performs one of the operations below. Manner one: the NACK is fed back to the base station.

Manner two: no feedback is performed until a next feedback occasion arrives.

In an embodiment, the N HARQ offset values indicated by one piece of DCI and configured by the base station are independent.

As shown in FIG. 5, ACK/NACK bit(s) fed back by the UE in the slot n+5 corresponds to a reception situation of four PDSCHs in the slot n to the slot n+3. If all the four PDSCHs are received and correct data information is received, the ACK is fed back to the base station so that the base station stops sending remaining PDSCH data in advance. If the UE fails to receive the correct data information, the UE feeds back the NACK or performs no feedback so that the base station continues sending the PDSCH data.

In an example, a system in the present embodiment includes one terminal and at least two TRPs. PDSCHs transmitted by the TRPs are non-alternately repeated (that is, the next TRP sends PDSCHs after one TRP finishes sending PDSCHs).

Figure 6:
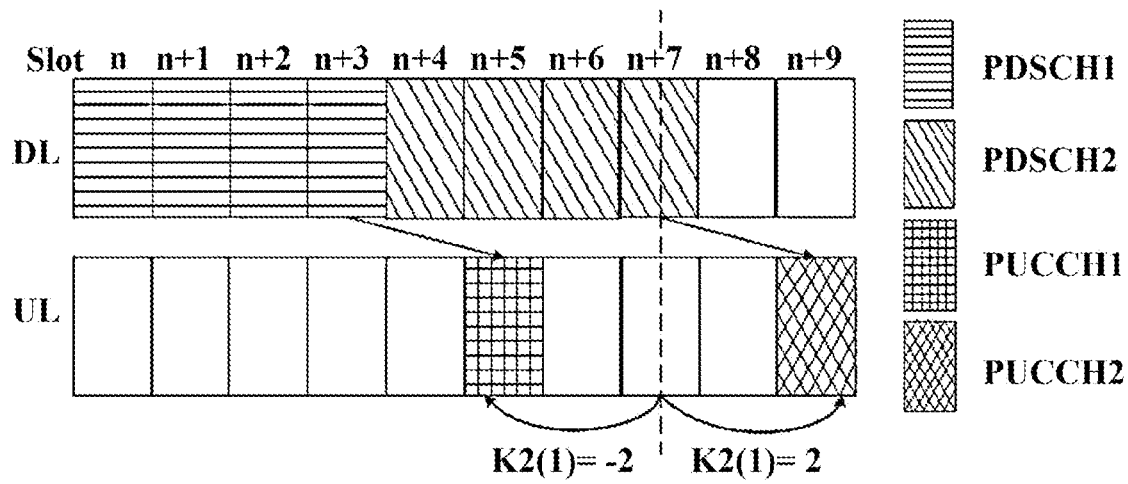
FIG. 6 is a diagram showing uplink transmission feedback corresponding to PDSCH non-alternating repetition transmissions according to an embodiment of the present application.

For example, it is assumed that a value of an HARQ offset value in DCI is (2, −2). FIG. 6 is a diagram showing uplink transmission feedback corresponding to PDSCH non-alternating repetition transmissions according to an embodiment of the present application.

A base station may perform the steps below.

(1) The base station configures a reference point of N HARQ offset values, with reference to which the DCI indicates a feedback slot of an HARQ-ACK.

In an embodiment, a manner in which the base station selects the reference point of the HARQ offset values includes, but is not limited to, one of the four selection manners described below.

Manner one: a slot where a last PDSCH among multiple PDSCHs is located may be used as the reference point of the HARQ offset values. For example, as shown in FIG. 6, a slot n+7 is the reference point of the HARQ offset values. In the case where the HARQ offset value is −4, an HARQ ACK/NACK is fed back in a slot n+3.

Manner two: a slot where a first PDSCH among multiple transmitted PDSCHs is located may be used as the reference point of the HARQ offset values. As shown in FIG. 6, a slot n is the reference point of the HARQ offset values. In the case where the HARQ offset value is 3, the HARQ ACK/NACK is fed back in the slot n+3.

Manner three: a slot where an intermediate PDSCH among multiple transmitted PDSCHs is located may be used as the reference point of the HARQ offset values. For example, the PDSCH is transmitted N times in total, and the reference point of the HARQ offset value may be an (N/2)-th PDSCH or an (N/2+1)-th PDSCH. As shown in FIG. 6, the reference point of the HARQ offset values may be the slot n+3 (or a slot n+4), and in the case where the value of the HARQ offset value is −2, the HARQ ACK/NACK is fed back in a slot n+1 (or a slot n+2).

Manner four: a slot where a last PDSCH among PDSCHs transmitted by a first or one TRP is located may be used as the reference point of the HARQ offset values. As shown in FIG. 6, the slot n+3 is the reference point of the HARQ offset values. In the case where the value of the HARQ offset value is −2, the HARQ ACK/NACK is fed back in the slot n+1. In an embodiment, the time occasion the HARQ ACK/NACK is fed back is the time of the reference point of the HARQ offset values+a feedback offset of the HACK-ACK.

In an embodiment, to efficiently use feedback information, when the base station selects the HARQ offset value, the HARQ offset value configured by the base station satisfies the following conditions: an interval between a first feedback slot (a value of a minimum feedback slot) indicated by the DCI and a transmission slot of a first PDSCH is at least greater than or equal to a PDSCH processing delay T; where in the case where the number of TRPs being greater than or equal to 2, the first feedback slot cannot be too early in that too early a first feedback slot will result in insufficient information received, reducing the possibility of correct reception, for example, the first feedback slot is at least after a second communication node has completely received PDSCHs from one TRP. As shown in FIG. 6, the time occasion the first TRP finishes sending PDSCHs is the slot n+3. In the case where the PDSCH processing delay T=2, the UE finishes receiving the PDSCHs from the first TRP in a slot n+5, that is, the first feedback slot should be after the slot n+5. An interval between a last feedback slot (a value of a maximum feedback slot) indicated by the DCI and an ending transmission slot of the PDSCHs is at least greater than or equal to the PDSCH processing delay T.

(2) The base station receives the HARQ-ACK fed back by the UE and determines a data transmission manner according to the received HARQ-ACK.

In an embodiment, the base station performs one of the following operations when the feedback information in the first feedback slot and received by the base station is an ACK.

Operation one: a master communication node (a master base station) notifies other TRPs to stop sending data. Two cases are described below.

Figure 7:
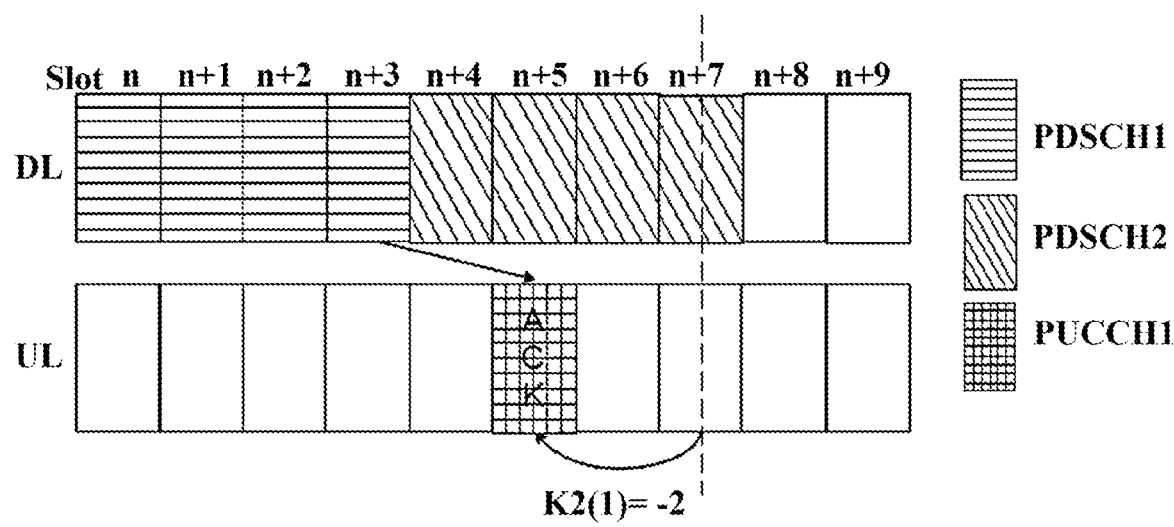
FIG. 7 is another diagram showing uplink transmission feedback corresponding to PDSCH non-alternating repetition transmissions according to an embodiment of the present application.

Case one: the other TRPs are already sending data. FIG. 7 is another diagram showing uplink transmission feedback corresponding to PDSCH non-alternating repetition transmissions according to an embodiment of the present application. As shown in FIG. 7, when the base station receives the feedback information ACK in the first feedback slot, the other TRPs are already sending the data.

In an embodiment, to completely receive the data sent by a TRP1, the first feedback slot is within the time occasion a TRP2 sends data (or after the TRP2 finishes sending the data) and the feedback cannot be performed before the TRP2 sends the data, and the master communication node notifies the TRP2 to stop sending a later part of the data and notifies the UE that no more feedback is needed.

Figure 8:
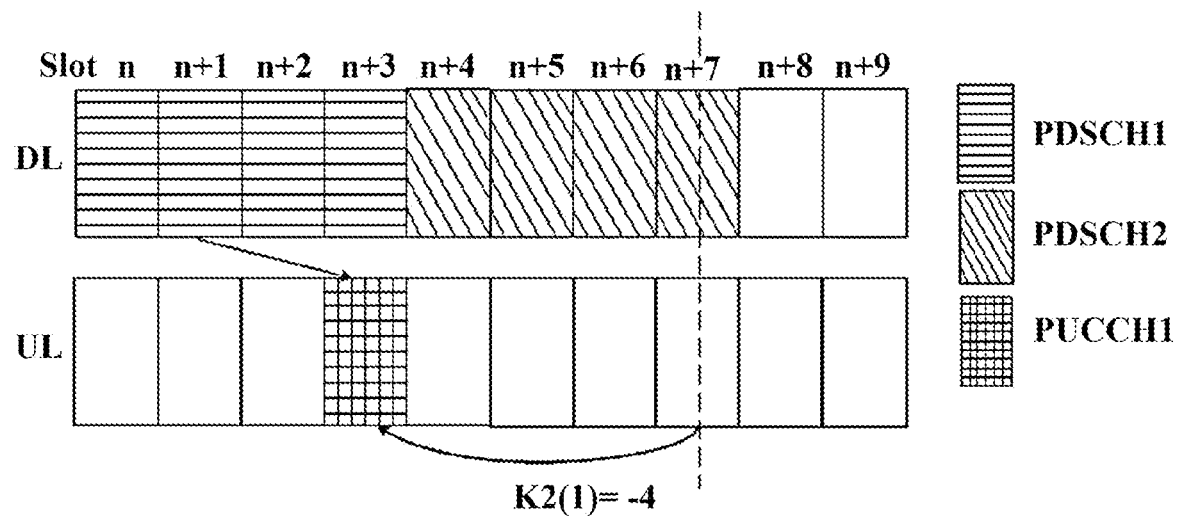
FIG. 8 is another diagram showing uplink transmission feedback corresponding to PDSCH non-alternating repetition transmissions according to an embodiment of the present application.

Case two: the other TRPs have not yet sent data. FIG. 8 is another diagram showing uplink transmission feedback corresponding to PDSCH non-alternating repetition transmissions according to an embodiment of the present application. As shown in FIG. 8, when the base station receives the feedback information in the first feedback slot, the other TRPs have not sent the data, and the master communication node notifies the TRP2 that the data is not sent.

Figure 9:
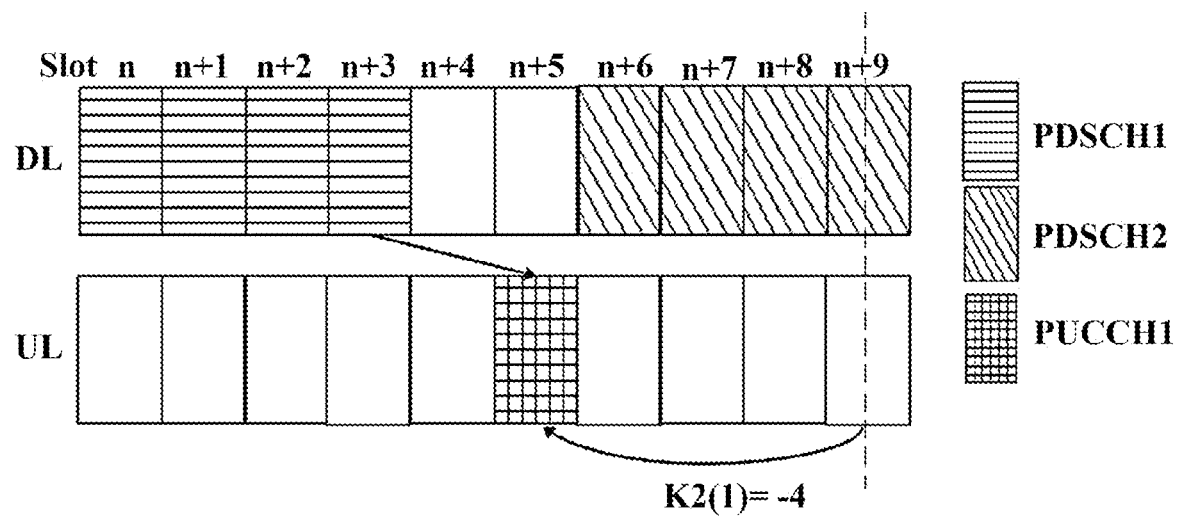
FIG. 9 is a diagram showing uplink transmission feedback corresponding to PDSCH non-alternating repetition transmissions with a time interval added according to an embodiment of the present application.

In an embodiment, for feedback before the TRP2 sends the data, the first feedback slot is before the TRP1 finishes sending the data, which may result in insufficient information received from the TRP1 and difficult to decode correctly. In an embodiment, the data transmission method further includes: inserting a time interval between multiple PDSCH repetition transmissions, that is, adding a time interval between PDSCH repetition transmissions of different TRPs. FIG. 9 is a diagram showing uplink transmission feedback corresponding to PDSCH non-alternating repetition transmissions with a time interval added according to an embodiment of the present application. As shown in FIG. 9, the time interval between repetition transmissions of multiple TRPs is set to two slots, and a slot n+9 is the reference point of the HARQ offset values. The HARQ offset value is set to −4, and the UE feeds back HARQ ACK/NACK information in the slot n+5. At this time, the TRP2 has not yet sent data, and the TRP1 notifies the TRP2 that the data is no longer sent and notifies the UE that no more feedback is needed.

Operation two: the TRP continues sending the data, but the UE stops receiving the data and no longer feeds back the HARQ ACK/NACK.

In the case where a backhaul between the TRPs is not ideal and other base stations cannot be quickly notified to stop sending data, the other base stations can be allowed to continue sending data, but the UE is notified that no more feedback is needed, and the other base stations will no longer receive feedback information.

In an embodiment, the base station continues sending the data when the feedback information in the first feedback slot and received by the base station is an NACK.

In an embodiment, the terminal performs the steps below.

In S1, the N HARQ offset values configured by the base station are received.

In S2, the HARQ-ACK is sent in a corresponding slot according to the configuration of the N HARQ offset values.

If an i-th HARQ offset value is successfully decoded, where i=1, 2, . . . , N−2, N−1, N (the UE has the N HARQ offset values), the ACK is fed back to the base station, and repetition transmissions after the PDSCH are no longer received.

If the i-th HARQ offset value fails to be decoded, the UE performs one of the operations described below.

Manner one: the NACK is fed back to the base station.

Manner two: no feedback is performed until a next feedback occasion arrives.

The base station notifies the UE of which manner to adopt.

In the present embodiment, the N HARQ offset values indicated by one piece of DCI and configured by the base station are independent.

In an example, a system in the present embodiment includes one terminal and at least two TRPs. PDSCHs transmitted by the TRPs are alternately repeated (that is, PDSCHs of multiple TRPs are transmitted repeatedly and cyclically).

Figure 10:
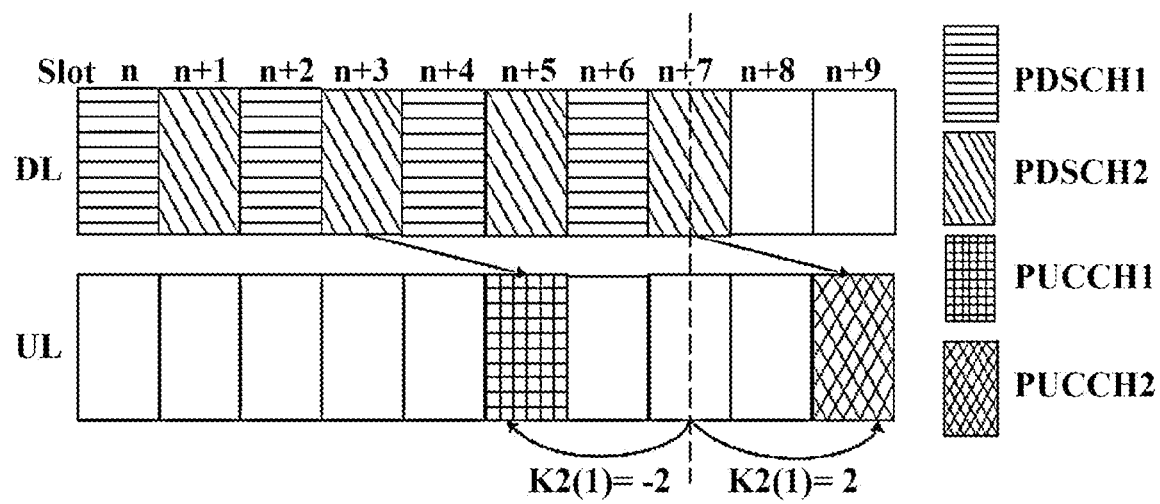
FIG. 10 is a diagram showing uplink transmission feedback corresponding to PDSCH alternating repetition transmissions according to an embodiment of the present application.

For example, it is assumed that a value of an HARQ offset value in DCI is (2, −2). FIG. 10 is a diagram showing uplink transmission feedback corresponding to PDSCH alternating repetition transmissions according to an embodiment of the present application.

A base station may perform the steps below.

(1) The base station configures a reference point of N HARQ offset values, with reference to which the DCI indicates a feedback slot of an HARQ-ACK.

In an embodiment, a manner in which the base station selects the reference point of the HARQ offset values includes, but is not limited to, one of the three selection manners described below.

Manner one: a slot where a last PDSCH among multiple PDSCHs is located may be used as the reference point of the HARQ offset values. For example, as shown in FIG. 10, a slot n+7 is the reference point of the HARQ offset values.

Manner two: a slot where a first PDSCH among multiple transmitted PDSCHs is located may be used as the reference point of the HARQ offset values. As shown in FIG. 10, a slot n is the reference point of the HARQ offset values. In the case where the HARQ offset value is 2, the HARQ ACK/NACK is fed back in a slot n+2.

Manner three: a slot where an intermediate PDSCH among multiple transmitted PDSCHs is located may be used as the reference point of the HARQ offset values. For example, the PDSCH is transmitted N times in total, and the reference point of the HARQ offset value may be an (N/2)-th PDSCH or an (N/2+1)-th PDSCH. As shown in FIG. 10, the reference point of the HARQ offset values may be a slot n+3 (or a slot n+4), and in the case where the value of the HARQ offset values is −2, the HARQ ACK/NACK is fed back in a slot n+1 (or the slot n+2). In an embodiment, the time occasion the HARQ ACK/NACK is fed back is the time of the reference point of the HARQ offset values+a feedback offset of the HACK-ACK.

In an embodiment, to efficiently use feedback information, when the base station selects the HARQ offset value, and the HARQ offset value configured by the base station satisfies the following conditions: an interval between a first feedback slot (a value of a minimum feedback slot) indicated by the DCI and a transmission slot of a first PDSCH is at least greater than or equal to a PDSCH processing delay T, where in the case where the number of TRPs being greater than or equal to 2, the first feedback slot cannot be too early in that too early a first feedback slot will result in insufficient information received, reducing the possibility of correct reception, for example, the first feedback slot is at least after a second communication node has completely received data on first PDSCH repetitions of all the TRPs. As shown in FIG. 10, the time occasion two TRPs finish their repeatedly sending first PDSCHs is the slot n+1. In the case where the downlink PDSCH processing delay T=2, the UE finishes receiving a PDSCH from a first TRP in the slot n+3, that is, the first feedback slot is after the slot n+3. An interval between a last feedback slot (a value of a maximum feedback slot) indicated by the DCI and an ending transmission slot of the PDSCHs is at least greater than or equal to the PDSCH processing delay T.

(2) The base station receives the HARQ-ACK fed back by the UE and determines a data transmission manner according to the received HARQ-ACK.

In an embodiment, the base station performs one of the following operations when the information in the first feedback slot and received by the base station is an ACK.

Operation one: a master base station notifies other TRPs to stop sending data.

Figure 11:
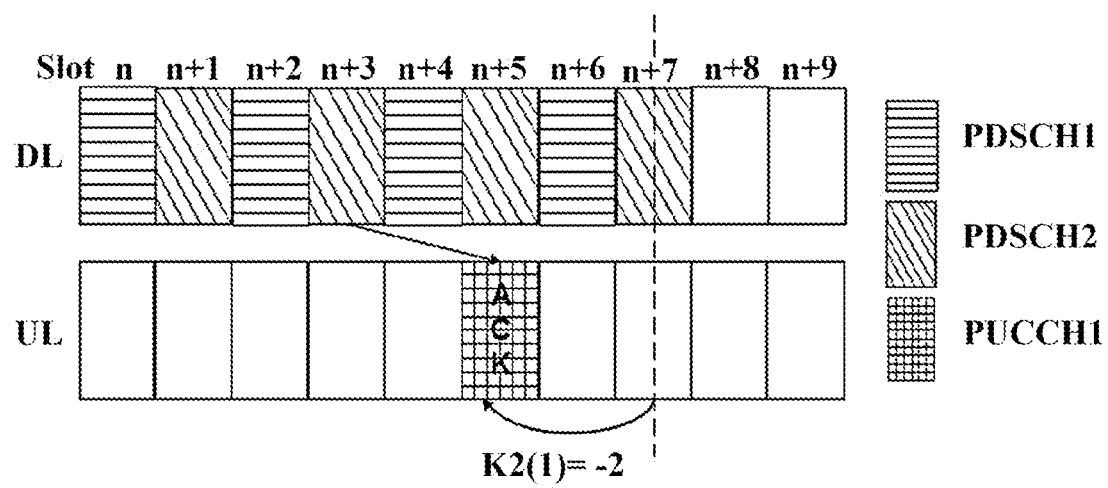
FIG. 11 is another diagram showing uplink transmission feedback corresponding to PDSCH alternating repetition transmissions according to an embodiment of the present application.

FIG. 11 is another diagram showing uplink transmission feedback corresponding to PDSCH alternating repetition transmissions according to an embodiment of the present application. In an embodiment, in the case where multiple TRPs perform alternating transmissions, as shown in FIG. 11, after the UE performs feedback in the first feedback slot (slot n+5) indicated by the DCI, the master base station receives the ACK information fed back by the UE and immediately stops sending data and notifies other base stations to stop sending data. Due to an information processing delay, the transmission of part of the data may be stopped, and the other base stations even receives a message to stop sending after sending all the data.

Operation two: the TRP continues sending data, but the UE stops receiving the data and no longer feeds back the ACK/NACK.

In the case where a backhaul between the TRPs is not ideal and other base stations cannot be quickly notified to stop sending data, the other base stations can be allowed to continue sending data, but the UE is notified that no more feedback is needed, and the other base stations will no longer receive feedback information.

In an embodiment, the base station continues sending the data when the feedback information in the first feedback slot and received by the base station is an NACK.

In an embodiment, the UE performs the steps below.

In S1, the N HARQ offset values configured by the base station are received.

In S2, the HARQ-ACK is sent in a corresponding slot according to the configuration of the N HARQ offset values.

If an i-th HARQ offset value is successfully decoded, where i=1, 2, . . . , N−2, N−1, N (the UE has the N HARQ offset values), the ACK is fed back to the base station, and repetition transmissions after the PDSCH are no longer received.

If the i-th HARQ offset value fails to be decoded, the UE performs one of the operations described below.

Manner one: the NACK is fed back to the base station.

Manner two: no feedback is performed until a next feedback occasion arrives.

In an implementation, the data transmission method further includes: in the case where uplink data is repeatedly sent, configuring multiple different beams for the second communication node.

In an embodiment, in the case of PUCCH repetition transmissions, the PUCCH repetition transmissions improve the robustness of the PUCCH transmission. In addition, the multiple different beams are configured for the second communication node, which can obtain a diversity gain and improve the reliability of uplink transmission.

In an embodiment, a first beam corresponds to a first group of PUCCHs, and a second beam corresponds to a second group of PUCCHs. The first group of PUCCHs is transmitted using the first beam, and the second group of PUCCHs is transmitted using the second beam.

In an embodiment, the first group of PUCCHs and the second group of PUCCHs are determined in at least one of the following manners: the first group of PUCCHs consists of PUCCHs whose transmission slots are less than or equal to K, and the second group of PUCCHs consists of PUCCHs whose transmission slots are greater than K, where K is a positive integer; the first group of PUCCHs consists of PUCCHs whose transmission slots are even-numbered, and the second group of PUCCHs consists of PUCCHs whose transmission slots are odd-numbered; or with reference to grouping of transmission control indicators (TCI) of PDSCHs, four PUCCH repetition transmissions are used as a transmission unit, and eight PUCCH repetition transmissions correspond to a splice of two transmission units.

In an embodiment, the PUCCH repetition transmissions are associated with a TCI state in one of the following manners: in the case where a PDCCH indicates one TCI state, the PUCCH repetition transmissions use a single-beam configuration; or in the case where a PDCCH indicates two TCI states, the PUCCH repetition transmissions use a multi-beam configuration.

In an embodiment, the data transmission method applied to the second communication node further includes: using different beam configurations when the uplink data is repeatedly sent.

In an example, the present embodiment is used for illustrating a multi-beam transmission problem of PUCCH repetition transmissions, and a PUCCH format (Format 1, Format 3 or Format 4) is configured to be that the PUCCH is repeatedly transmitted in N slots, where N may be configured to be 2, 4 or 8 by a higher-layer parameter. To obtain the diversity gain, multi-beam transmission may be performed on the basis of the PUCCH repetition transmissions, and multiple beams may be indicated in the following manner: the multiple beams are activated by an MAC-CE, or multiple PUCCH resource groups are specified, where each of the multiple PUCCH resource groups corresponds to one spatial relationship.

A system in the present embodiment includes one terminal and at least one TRP, and a UE side includes two panels, where both PDSCHs transmitted by the TRP and PUCCHs transmitted by the UE are repeated.

In 3GPP Release 15 (R15), a PUCCH spatial relationship is indicated by a PUCCH resource identification (PRI) in the MAC-CE, where the field has a length of seven bits. FIG. 12 is a structure diagram of a PRI according to an embodiment of the present application.

As shown in FIG. 12, Si indicates an activation state of a PUCCH spatial relationship corresponding to a number i of the PUCCH spatial relationship. When Si is set to 0, it indicates that the PUCCH spatial relationship corresponding to the number i of the PUCCH spatial relationship should be deactivated. When Si is set to 1, it indicates that the PUCCH spatial relationship corresponding to the number i of the PUCCH spatial relationship should be activated.

Only one PUCCH spatial relationship can be activated for one PUCCH resource at a time.

In R16, the PUCCH repetition transmissions use the multi-beam transmission manner, which may include, but is not limited to, the two manners described below.

Manner one: the MAC-CE is used for activating multiple PUCCH spatial relationships, that is, multiple beams, for one PUCCH resource.

Manner two: PUCCH resources are grouped to form multiple PUCCH resource groups, where each PUCCH resource group corresponds to one spatial relationship, and PUCCH resources in different PUCCH resource groups may overlap. For example, the PUCCH resources i (i=0, 1, . . . , N) are grouped to form K PUCCH resource groups (a maximum value of K is 4), where a PUCCH resource group 0 includes PUCCH resources 1, 4, 5 and 9, a PUCCH resource group 1 includes PUCCH resources 0, 3, 4 and 8, and a PUCCH resource group 2 includes PUCCH resources 2, 6, 7 and 8. When the PUCCH resources that repeatedly appear in multiple PUCCH resource groups (for example, the PUCCH resources 4 and 8) are selected, multiple beams may be used for repeatedly sending the PUCCH.

In an embodiment, the terminal performs the steps below.

(1) The number of beams used for sending PUCCH repetitions is determined according to the indicated PUCCH spatial relationship.

(2) According to the indicated number of beams, the UE performs the following operation: when the indicated number of beams is equal to 1, the same beam is used for the PUCCH repetition transmissions. FIG. 13 is a diagram showing a beam used for PUCCH repetition transmissions according to an embodiment of the present application. As shown in FIG. 13, the same beam is used for PUCCH data transmissions.

When the indicated number of beams is equal to 2 (which is not limited to 2 and may be greater than 2), the PUCCH repetition transmissions may be grouped, and different beams are used for PUCCHs in different groups. The PUCCH repetition transmissions are grouped through the three schemes described below.

Scheme one: the whole PUCCH repetition transmissions may be grouped, where a first group of PUCCHs consists of PUCCH resources whose transmission slots are less than or equal to K, and a second group of PUCCHs consists of PUCCHs whose transmission slots are greater than K, where K is a positive integer. For N PUCCH repetition transmissions, K=⌈N/2⌉ or ⌊N/2⌋, that is, the N repetition transmissions are divided into a first half and a second half which correspond to different beams, respectively. FIG. 14 is another diagram showing beams used for PUCCH repetition transmissions according to an embodiment of the present application. As shown in FIG. 14, a first beam corresponds to a first part of the PUCCH repetition transmissions, and a second beam corresponds to a second part of the PUCCH repetition transmissions.

Figure 15:
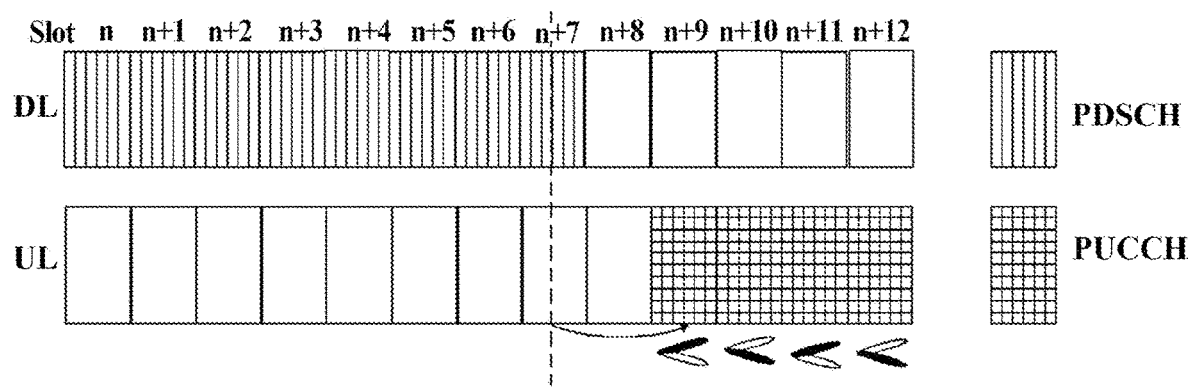
FIG. 15 is another diagram showing beams used for PUCCH repetition transmissions according to an embodiment of the present application.

Scheme two: the PUCCH repetition transmissions may be grouped according to an odd number and an even number, where the first beam corresponds to PUCCH repetition transmissions of a group with an even-numbered slot number, and the second beam corresponds to PUCCH repetition transmissions of a group with an odd-numbered slot number. FIG. 15 is another diagram showing beams used for PUCCH repetition transmissions according to an embodiment of the present application. As shown in FIG. 15, the first beam corresponds to PUCCH repetition transmissions in even-numbered slots, and the second beam corresponds to PUCCH repetition transmissions in odd-numbered slots.

Scheme three is a combination of Scheme one and Scheme two and is used when more than four PUCCH repetition transmissions are performed. For example, the grouping manners of the PUCCH repetition transmissions in Scheme one or Scheme two may be selected for four PUCCH repetition transmissions, and four PUCCH repetition transmissions are spliced with four PUCCH repetition transmissions for eight PUCCH repetition transmissions.

The UE may select one of Schemes one to three, for example, the base station notifies the terminal through signaling, or the three schemes are selected according to an agreed criterion, for example, the scheme is determined according to a moving speed or a Doppler shift.

(3) An HARQ-ACK is sent using a corresponding beam according to the grouping of the PUCCHs.

In the present embodiment, the feedback time of the UE indicated by the base station must satisfy a PDSCH processing time to ensure that the UE receives all PDSCHs.

In an example, the present embodiment is used for illustrating an association between the multi-beam transmission of the PUCCH repetition transmission with downlink.

A system in the present embodiment includes one terminal and at least one TRP, and a UE side includes two panels, where both PDSCHs transmitted by the TRP and PUCCHs transmitted by the UE are repeated.

When two beams are activated for one PUCCH by an MAC-CE, the two cases below are considered for whether the PUCCH is sent by using one beam or two beams considering the association with downlink transmission.

Case one: if a PDSCH indicates one TCI state, that is, in the case of a single TRP, if the selected PUCCH resource corresponds to two available beams, only one uplink beam is selected for PUCCH repetition transmissions.

Case two: If the PDSCH indicates two TCI states, that is, in the case of multiple TRPs, if the selected PUCCH resource corresponds to two available beams, both two uplink beams are used for the PUCCH repetition transmissions. For the explanation of beam grouping, reference may be made to the description of the preceding embodiments, which is not repeated here.

In the present embodiment, the feedback time of the UE indicated by the base station must satisfy the PDSCH processing time to ensure that the UE receives all the PDSCHs.

Figure 16:
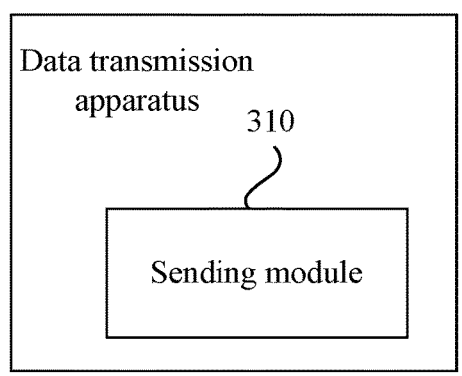
FIG. 16 is a block diagram of a data transmission apparatus according to an embodiment of the present application.

FIG. 16 is a block diagram of a data transmission apparatus according to an embodiment of the present application. The present embodiment is applied to a first communication node. As shown in FIG. 16, the data transmission apparatus in the present embodiment includes a sending module 310.

The sending module 310 is configured to send DCI to a second communication node, where the DCI is configured for indicating one or more HARQ offset values.

The data transmission apparatus provided in the present embodiment is configured to implement the data transmission method in the embodiment shown in FIG. 2. The data transmission apparatus provided in the present embodiment has similar implementation principles and technical effects, which are not repeated here.

In an embodiment, X groups of HARQ offset values are configured by higher-layer signaling, and one group of HARQ offset values is selected from the configured multiple groups of HARQ offset values by using the DCI, where each of the X groups of HARQ offset values includes one or more HARQ offset values, and X is an integer greater than or equal to 1.

In an embodiment, N groups of HARQ offset values are configured by higher-layer signaling and one HARQ offset value is selected from each of the configured N groups of HARQ offset values by using the DCI, where each of the N groups of HARQ offset values includes one or more HARQ offset values, and N is an integer greater than or equal to 1.

In an embodiment, a reference point of the HARQ offset values is selected in one of the following manners: a slot where a last PDSCH in multiple PDSCH repetition transmissions is located; a slot where a first PDSCH in multiple PDSCH repetition transmissions is located; or a slot where an intermediate PDSCH in multiple PDSCH repetition transmissions is located.

In an embodiment, a feedback slot corresponding to the configured HARQ offset value satisfies the following conditions: an interval between a first feedback slot and a transmission slot of a first PDSCH being greater than or equal to a PDSCH processing delay; and an interval between a last feedback slot and an ending transmission slot of PDSCHs being greater than or equal to the PDSCH processing delay.

In an embodiment, the feedback slot corresponding to the configured HARQ offset value further satisfies the following condition: the first feedback slot is at least after the second communication node receives data on M PDSCHs, where $M=\lceil N/2 \rceil$ or $M=\lfloor N/2 \rfloor$, and N is the total number of PDSCH repetition transmissions.

In an embodiment, in the case where ACK information fed back by the second communication node is received, a UE is notified to no longer feed back an HARQ-ACK corresponding to a repeatedly transmitted PDSCH in another subsequent slot.

In an embodiment, in the case where a master communication node among multiple first-type communication nodes receives the ACK information fed back by the second communication node, the master communication node immediately stops sending a repeatedly transmitted PDSCH.

In the case where the master communication node among the multiple first-type communication nodes receives the ACK information fed back by the second communication node, a data sending situation of other first-type communication nodes except the master communication node includes one of the following: in the case where the other first-type communication nodes have sent data, the master communication node notifies the other first-type communication nodes to stop sending remaining repeatedly transmitted PDSCHs.

In the case where the other first-type communication nodes have not sent data, the master communication node notifies the other first-type communication nodes that the data does not need to be sent.

In an embodiment, the data transmission apparatus further includes an insertion module configured to insert an interval between PDSCH repetition transmissions, where the interval is equal to or greater than L, and L is configured by a higher-layer parameter.

In an embodiment, the data transmission apparatus further includes a configuration module. The configuration module is configured to configure multiple different beams for the second communication node in the case where uplink data is repeatedly sent.

In an embodiment, multiple beams are configured in one of the following manners: the multiple beams are activated by an MAC-CE; or multiple PUCCH resource groups are configured, where each of the multiple PUCCH resource groups corresponds to one spatial relationship.

In an embodiment, a first beam corresponds to a first group of PUCCHs, and a second beam corresponds to a second group of PUCCHs; the first group of PUCCHs is transmitted using the first beam, and the second group of PUCCHs is transmitted using the second beam.

In an embodiment, the first group of PUCCHs and the second group of PUCCHs are determined in at least one of the following manners: the first group of PUCCHs includes PUCCH resources whose transmission slots are less than or equal to K, and the second group of PUCCHs includes PUCCHs whose transmission slots are greater than K, where K is a positive integer, and for N PUCCH repetition transmissions, $K=\lceil N/2 \rceil$ or $K=\lfloor N/2 \rfloor$; the first group of PUCCHs consists of PUCCH resources whose transmission slots are even-numbered, and the second group of PUCCHs includes PUCCHs whose transmission slots are odd-numbered; or with reference to grouping of TCIs of PDSCHs, four PUCCH repetition transmissions are used as a transmission unit, and eight PUCCH repetition transmissions correspond to a splice of two transmission units.

In an embodiment, in the case where a multi-beam configuration is associated with downlink, the PUCCH repetition transmissions are associated with a TCI state in one of the following manners: in the case where a PDCCH indicates one TCI state, PUCCH repetitions use a single-beam configuration; or in the case where a PDCCH indicates two TCI states, PUCCH repetitions use the multi-beam configuration.

Figure 17:
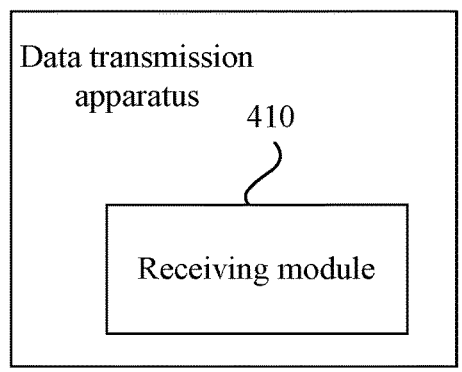
FIG. 17 is a block diagram of another data transmission apparatus according to an embodiment of the present application.

FIG. 17 is a block diagram of another data transmission apparatus according to an embodiment of the present application. The present embodiment is applied to a second communication node. As shown in FIG. 17, the data transmission apparatus in the present embodiment includes a receiving module 410.

The receiving module 410 is configured to receive DCI sent by a first communication node, where the DCI is configured for indicating one or more HARQ offset values.

The data transmission apparatus provided in the present embodiment is configured to implement the data transmission method in the embodiment shown in FIG. 3. The data transmission apparatus provided in the present embodiment has similar implementation principles and technical effects, which are not repeated here.

In an embodiment, in the case where an ACK is fed back to the first communication node at a first occasion, an HARQ-ACK is no longer fed back at a second occasion and remaining downlink data is no longer received.

In an embodiment, the data transmission apparatus applied to the second communication node further includes: using different beam configurations when uplink data is repeatedly sent.

Figure 18:
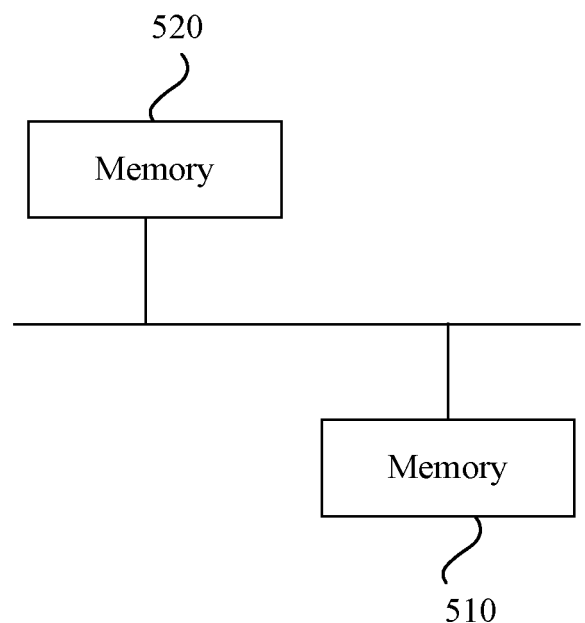
FIG. 18 is a structure diagram of a device according to an embodiment of the present application.

FIG. 18 is a structure diagram of a device according to an embodiment of the present application. As shown in FIG. 18, the device provided by the present application includes a processor 510 and a memory 520. One or more processors 510 may be disposed in the device. FIG. 18 shows one processor 510 as an example. One or more memories 520 may be disposed in the device. FIG. 18 shows one memory 520 as an example. The processor 510 and the memory 520 in the device may be connected by a bus or in other manners. FIG. 18 shows a connection by the bus as an example. In the present embodiment, the device is a first communication node which may be a base station. The memory 520, as a computer-readable storage medium, may be configured to store software programs, computer-executable programs and modules, such as program instructions/modules corresponding to the device in any embodiment of the present application (for example, the sending module in the data transmission apparatus). The memory 520 may include a program storage region and a data storage region, where the program storage region may store an operating system and an application program required by at least one function, and the data storage region may store data created depending on the use of the device. Additionally, the memory 520 may include a high-speed random-access memory and may further include a non-volatile memory such as at least one magnetic disk memory, a flash memory or another non-volatile solid-state memory. In some examples, the memory 520 may further include memories disposed remotely relative to the processor 510, and these remote memories may be connected to the device via a network. Examples of the preceding network include, but are not limited to, the Internet, an intranet, a local area network, a mobile communication network and a combination thereof.

The preceding device may be configured to perform the data transmission method applied to the first communication node and provided in any preceding embodiment and has corresponding functions and effects.

When the device is a second communication node (for example, the second communication node is a UE), the program stored in the corresponding memory 520 may be a program instruction/module corresponding to the data transmission method applied to the UE and provided in the embodiments of the present application. The processor 510 executes the software programs, instructions and modules stored in the memory 520 so as to perform one or more function applications and data processing of a computer device, that is, to implement the data transmission method applied to the UE in the above method embodiments. It is to be understood that when the above device is the UE, the above device may perform the data transmission method applied to the UE and provided in any embodiment of the present application and has corresponding functions and effects.

Embodiments of the present application further provide a storage medium including a computer-executable instruction, where the computer-executable instruction, when executed by a processor of a computer, is used for performing a data transmission method. The method is applied to a first communication node and includes: sending DCI to a second communication node, where the DCI is configured for indicating one or more HARQ offset values.

Embodiments of the present application further provide a storage medium including a computer-executable instruction, where the computer-executable instruction, when executed by a processor of a computer, is used for performing a data transmission method. The method is applied to a second communication node and includes: receiving DCI sent by a first communication node, where the DCI is configured for indicating one or more HARQ offset values.

It is to be understood by those skilled in the art that the term "user equipment" covers any suitable type of radio UE, for example, a mobile phone, a portable data processing device, a portable web browser or a vehicle-mounted mobile station.

In general, multiple embodiments of the present application may be implemented in hardware, dedicated circuits, software, logics or any combination thereof. For example, some aspects may be implemented in hardware while other aspects may be implemented in firmware or software that may be executed by a controller, a microprocessor or another computing apparatus, though the present application is not limited thereto.

Embodiments of the present application may be implemented by computer program instructions executed by a data processor of a mobile apparatus, for example, implemented in a processor entity, by hardware or by a combination of software and hardware. The computer program instructions may be assembly instructions, instruction set architecture (ISA) instructions, machine instructions, machine-related instructions, microcodes, firmware instructions, status setting data or source or object codes written in any combination of one or more programming languages.

A block diagram of any logic flow among the drawings of the present application may represent program steps, may represent interconnected logic circuits, modules and functions, or may represent a combination of program steps with logic circuits, modules and functions. Computer programs may be stored in a memory. The memory may be of any type suitable for a local technical environment and may be implemented using any suitable data storage technology, such as, but not limited to, a read-only memory (ROM), a random-access memory (RAM) and an optical memory device and system (digital video disc (DVD) or compact disc (CD)). Computer-readable media may include non-transitory storage media. The data processor may be of any type suitable for the local technical environment, such as, but not limited to, a general-purpose computer, a special-purpose computer, a microprocessor, a digital signal processor (DSP), an application-specific integrated circuit (ASIC), a field-programmable gate array (FPGA) and a processor based on a multi-core processor architecture.

What is claimed is:

1. A data transmission method, applied to a first communication node, comprising:
 sending downlink control information (DCI) to a second communication node, wherein the DCI is configured for indicating at least one Hybrid Automatic Repeat reQuest (HARQ) offset value;
 wherein a feedback slot corresponding to the configured at least one HARQ offset value satisfies the following conditions: an interval between a first feedback slot and a transmission slot of a first PDSCH repetition transmission in a plurality of PDSCH repetition transmissions being greater than or equal to a PDSCH processing delay; and
 wherein the first feedback slot being at least after the second communication node receives M PDSCHs, wherein M=⌈N/2⌉ or M=⌊N/2⌋, and N is a total number of the PDSCH repetition transmissions.

2. The method according to claim 1, wherein the sending the DCI to the second communication node comprises:
 configuring X groups of HARQ offset values by higher-layer signaling and selecting one group of HARQ offset values from the configured X groups of HARQ offset values by using the DCI, wherein each of the X groups of HARQ offset values comprises at least one HARQ offset value, and X is an integer greater than or equal to 1.

3. The method according to claim 1, wherein the sending the DCI to the second communication node comprises:
 configuring N groups of HARQ offset values by higher-layer signaling and selecting one HARQ offset value from each of the configured N groups of HARQ offset values by using the DCI, wherein each of the N groups of HARQ offset values comprises at least one HARQ offset value, and N is an integer greater than or equal to 1.

4. The method according to claim 1, wherein a reference point of the at least one HARQ offset value is selected in one of the following manners: a slot where a last physical downlink shared channel (PDSCH) in a plurality of PDSCH repetition transmissions is located; a slot where a first PDSCH in a plurality of PDSCH repetition transmissions is located; or a slot where an intermediate PDSCH in a plurality of PDSCH repetition transmissions is located.

5. The method according to claim 1, further comprising: in a case where an acknowledgement (ACK) fed back by the second communication node is received, notifying the second communication node to no longer feed back an HARQ acknowledgement (HARQ-ACK) corresponding to a repeatedly transmitted PDSCH in another slot after a slot where the received ACK is located.

6. The method according to claim 1, wherein the first communication node is a master communication node among a plurality of first-type communication nodes;
 the method further comprises: in a case where the master communication node among the plurality of first-type communication nodes receives an ACK fed back by the second communication node, the master communication node immediately stops sending a repeatedly transmitted PDSCH;
 in a case where the master communication node among the plurality of first-type communication nodes receives the ACK fed back by the second communication node, a data sending situation of other first-type communication nodes except the master communication node comprises one of the following:
  in a case where the other first-type communication nodes have sent data, the master communication node notifies the other first-type communication nodes to stop sending remaining repeatedly transmitted PDSCHs; or
  in a case where the other first-type communication nodes have not sent data, the master communication node notifies the other first-type communication nodes that the data does not need to be sent.

7. The method according to claim 5, wherein the method further comprises that a time interval between two PDSCH repetition transmissions being greater than or equal to L, wherein L is configured by a higher-layer parameter.

8. The method according to claim 1, further comprising:
 in a case where uplink data is repeatedly sent, configuring a plurality of different beams for the second communication node.

9. The method according to claim 8, wherein the plurality of different beams are configured in one of the following manners: the plurality of different beams are activated by a medium access control-control element (MAC-CE); or a plurality of physical uplink control channel (PUCCH) resource groups are configured, wherein each of the plurality of PUCCH resource groups corresponds to one spatial relationship.

10. The method according to claim 9, wherein the plurality of different beams comprises a first beam and a second beam; wherein the first beam corresponds to a first group of PUCCHs, and the second beam corresponds to a second group of PUCCHs;
 wherein the first group of PUCCHs is transmitted using the first beam, and the second group of PUCCHs is transmitted using the second beam.

11. The method according to claim 10, wherein the first group of PUCCHs and the second group of PUCCHs are determined in at least one of the following manners:
 the first group of PUCCHs comprises PUCCHs whose transmission slots are less than or equal to K in a plurality of PUCCH repetition transmissions, and the second group of PUCCHs comprises PUCCHs whose transmission slots are greater than K in the plurality of PUCCH repetition transmissions, wherein K is a positive integer;
 the first group of PUCCHs comprises PUCCHs whose transmission slots are even-numbered in a plurality of PUCCH repetition transmissions, and the second group of PUCCHs comprises PUCCHs whose transmission slots are odd-numbered in the plurality of PUCCH repetition transmissions; or
 with reference to grouping of transmission control indicators (TCIs) of PDSCHs, four PUCCH repetition transmissions are used as a transmission unit, and eight PUCCH repetition transmissions correspond to a splice of two transmission units.

12. The method according to claim 11, wherein the PUCCH repetition transmissions are associated with a TCI state in one of the following manners: in a case where a physical downlink control channel (PDCCH) indicates one TCI state, the PUCCH repetition transmissions use a single-beam configuration; or in a case where a PDCCH indicates two TCI states, the PUCCH repetition transmissions use a multi-beam configuration.

13. A data transmission method, applied to a second communication node, comprising:
   receiving downlink control information (DCI) sent by a first communication node, wherein the DCI is configured for indicating at least one Hybrid Automatic Repeat reQuest (HARQ) offset value;
   wherein a feedback slot corresponding to the configured at least one HARQ offset value satisfies the following conditions: an interval between a first feedback slot and a transmission slot of a first PDSCH repetition transmission in a plurality of PDSCH repetition transmissions being greater than or equal to a PDSCH processing delay; and
   wherein the first feedback slot being at least after the second communication node receives M PDSCHs, wherein M=$\lceil N/2 \rceil$ or M=$\lfloor N/2 \rfloor$, and N is a total number of the PDSCH repetition transmissions.

14. The method according to claim 13, further comprising: in a case where an acknowledgement (ACK) is fed back to the first communication node at a first occasion, no longer feeding back an HARQ acknowledgement (HARQ-ACK) at a second occasion and no longer receiving remaining downlink data.

15. The method according to claim 13, further comprising:
   in a case where uplink data is repeatedly sent, repeatedly sending the uplink data using different beam configurations.

16. A data transmission apparatus, applied to a first communication node, comprising:
   at least one processor and a memory, wherein the memory stores a computer program, and the at least one processor is configured to execute the computer program to implement the method of claim 1.

17. A data transmission apparatus, applied to a second communication node, comprising:
   at least one processor and a memory, wherein the memory stores a computer program, and the at least one processor is configured to execute the computer program to implement the method of claim 13.

18. A non-transitory storage medium storing a computer program, wherein the computer program, when executed by a processor, implements the data transmission method according to claim 1.

* * * * *